United States Patent [19]
Lucas

[11] Patent Number: 5,866,258
[45] Date of Patent: Feb. 2, 1999

[54] INTERPENETRATING POLYMER NETWORK COMPOSITIONS

[75] Inventor: Howard Robert Lucas, Danbury, Conn.

[73] Assignee: Cytec Technology Corp., Stamford, Conn.

[21] Appl. No.: 442,064

[22] Filed: May 16, 1995

Related U.S. Application Data

[62] Division of Ser. No. 221,315, Mar. 31, 1994, Pat. No. 5,763,529.

[51] Int. Cl.$^6$ ..................................................... B32B 27/00
[52] U.S. Cl. ........................................ 428/424.2; 428/500
[58] Field of Search ................................. 428/424.2, 500

[56] References Cited

U.S. PATENT DOCUMENTS

| | | | |
|---|---|---|---|
| 3,479,310 | 11/1969 | Dieterich et al. | 260/29.2 |
| 3,905,929 | 9/1975 | Noll | 260/29.2 |
| 3,920,598 | 11/1975 | Reiff et al. | 260/29.2 |
| 4,088,626 | 5/1978 | Gergen et al. | 260/42.18 |
| 4,092,286 | 5/1978 | Noll et al. | 260/29.2 |
| 4,147,679 | 4/1979 | Scriven et al. | 260/29.2 |
| 4,172,191 | 10/1979 | Nachtkamp et al. | 528/61 |
| 4,183,836 | 1/1980 | Wolfe, Jr. | 260/29.2 |
| 4,203,883 | 5/1980 | Hangauyer, Jr. | 260/29.2 |
| 4,302,553 | 11/1981 | Fresch et al. | 525/28 |
| 4,318,833 | 3/1982 | Guagliardo | 524/457 |
| 4,594,397 | 6/1986 | Goel et al. | 525/528 |
| 4,616,057 | 10/1986 | Lindemann et al. | 524/458 |
| 4,644,030 | 2/1987 | Loewrigkeit et al. | 524/457 |
| 4,683,165 | 7/1987 | Lindemann et al. | 428/290 |
| 4,888,383 | 12/1989 | Huybrechts | 524/832 |
| 4,923,934 | 5/1990 | Werner | 525/528 |
| 5,021,507 | 6/1991 | Stanley et al. | 525/127 |
| 5,091,455 | 2/1992 | Blank et al. | 524/297 |
| 5,154,959 | 10/1992 | Dei Rossi | 428/67 |
| 5,169,884 | 12/1992 | Lindemann et al. | 524/44 |
| 5,173,526 | 12/1992 | Vijayendran et al. | 524/457 |
| 5,177,128 | 1/1993 | Lindemann et al. | 524/44 |
| 5,237,018 | 8/1993 | Sorathia et al. | 525/454 |
| 5,250,607 | 10/1993 | Comert et al. | 524/507 |

FOREIGN PATENT DOCUMENTS

| | | |
|---|---|---|
| 0281910 | 9/1988 | European Pat. Off. . |
| 0510572 | 10/1992 | European Pat. Off. . |
| 0551568 | 7/1993 | European Pat. Off. . |
| 0583777 | 2/1994 | European Pat. Off. . |

OTHER PUBLICATIONS

Cody, "Unique waterborne systems based on TXMDI® (meta) aliphatic isocyanate and TMI® (meta) unsaturated isocyanate," *Progress in Organic Coatings*, 22 (1993) 107–123.

Sperling, "IPNS Around the World", *Progress in Organic Coatings*, 22 (1993) 1–9.

D. Dieterich, "Recent Developments in Aqueous Polyurethanes,"*Proceedings of the Sixth International Conference in Organic Coatings Science Technology*, vol. 4, Advance in Organic Coatings Science and Technology Series (1980) pp. 51–71.

Hegedus et al., "Acrylic–Polyurethane Aqueous Dispersions: Structure and Properties in Industrial Coatings", *Proceedings of the Waterborne, Higher–Solids, and Powder Coatings Symposium* (Feb. 9–11, 1994), pp. 144–167.

Hsieh et al., "Compatibility and Morphology in Polyurethane and Polystyrene Ionomeric Interpenetrating Networks," vol. 21, No. 1, pp. 1–10 (1989).

International Search Report for PCT/US95/04056.

*Primary Examiner*—Peter D. Mulcahy
*Attorney, Agent, or Firm*—Pennie & Edmonds LLP

[57] ABSTRACT

Provided is an aqueous-dispersible, self-crosslinkable interpenetrating polymer network composition which comprises an aqueous-dispersible, isocyanate-based thermoplastic polymer containing urethane and/or urea linkage and an interpenetrating polymer containing latent reactive functionality, whereby the two polymers are at least partially entangled with each other on a molecular level. Also provided are aqueous dispersions of such self-crosslinkable interpenetrating polymer networks, methods of producing such aqueous dispersions, coating compositions therefrom and coated substrates and films obtained from it.

14 Claims, No Drawings

INTERPENETRATING POLYMER NETWORK COMPOSITIONS

This application is a divisional of U.S. application Ser. No. 08/221,315, filed Mar. 31, 1994 U.S. Pat. No. 5,763,529.

BACKGROUND OF THE INVENTION

1. Field of the Invention

This invention relates to an interpenetrating polymer network ("IPN") composition, a method for making it, aqueous dispersions thereof, coating compositions therefrom and coated substrates and films obtained from it. More particularly, and in a preferred embodiment, this invention relates to an aqueous-dispersible, self-crosslinkable IPN composition which comprises an aqueous-dispersible, isocyanate-based thermoplastic polymer containing urethane and/or urea linkage and an interpenetrating addition polymer, whereby the two polymers are at least partially entangled with each other on a molecular level.

2. Description of the Prior Art

In recent years, environmental concerns and regulations have forced reductions in the Volatile Organic Content ("VOC") of solvent-borne coatings (i.e., the amount of organic material volatilized during use of the coatings). In fact, coatings manufacturers have investigated the total replacement of organic solvents with water. For example, coatings manufacturers have been able to convert from organic solvent-borne systems to waterborne systems by employing polymers containing small amounts of ionic and/or non-ionic stabilizing groups located along the backbone of the polymer chain. As a common example may be mentioned thermoplastic urethanes obtained by reacting difunctional isocyanates with difunctional hydroxyl polymers in the presence of a dihydroxyalkanoic acid. Once ionized, the pendant carboxyl groups serve to render the urethane polymer dispersible in water, producing a product similar to a latex in many aspects. See, for example, U.S. Pat. Nos. 3,479,310, 3,905,929, 3,920,598, 4,092,286, 4,172,191 and 4,183,836, and the following articles:

D. Dieterich, "Recent Developments in Aqueous Polyurethanes," *Proceedings of the Sixth International Conference in Organic Coatings Science and Technology*, Vol. 4 (1982), pages 51–71; and R. Cody, "Unique Waterborne Systems Based on TMXDI® (meta) Aliphatic Isocyanate and TMI® (meta) Unsaturated Isocyanate," *Progress in Organic Coatings*, 22 (1993), pages 107–123.

Depending on the glass transition temperature (Tg) of the thermoplastic polymer, some dispersions may require the use of small amounts of an organic cosolvent. The cosolvent plasticizes the polymer particles, softening them, by lowering the glass transition temperature (Tg) to a point where particle coalescence occurs at the temperature of application. If solvent resistance is desired, separate crosslinking agents such as carbodiimides can be added just prior to the application to convert the thermoplastic dispersion to a thermoset coating. Although organic cosolvents and crosslinking agents are generally a minimum VOC concern in these formulations, they still produce volatiles potentially hazardous to the environment.

Depending on the type of hydroxyl polymer component of the thermoplastic polymer, one can obtain coatings or films of high tensile strength, modulus and break strength, with low elongation. Using more flexible hydroxyl polymers one obtains lower tensile strength and modulus with higher elongations. Typically, however, thermoplastic urethanes of this type do not have both high strength and high elongation. In addition, coatings or films produced from these thermoplastic urethane dispersions may suffer from poor organic solvent resistance.

U.S. Pat. No. 4,644,030 discloses a method of making a stable aqueous dispersion of a polymeric material which comprises: (a) producing an isocyanate-terminated polyurethane prepolymer in the presence of inert liquid polymerizable ethylenically-unsaturated monomer material as a solvent or diluent; (b) dispersing the resulting product in water; (c) chain-extending the prepolymer in the resulting aqueous dispersion; and (d) subjecting the resulting aqueous dispersion to vinyl addition polymerization conditions to polymerize the monomer material in situ. The polymerizable ethylenically-unsaturated monomers must be inert to the prepolymer-forming reaction; that is, they must be devoid of groups interfering with or reactive with the primary isocyanate and active hydrogen-containing reactants. Thus, the monomers should be devoid of —NCO groups and active hydrogen-containing groups such as —OH. The isocyanate-terminated polyurethane prepolymer may be rendered water-dispersible by the known expedient of including in its polymer chain an effective amount (about 0.5–10 weight %) of pendant carboxylic groups which may be neutralized to salt form with a suitable basic material during or after prepolymer formation. The chain extension, which produces a fully reacted polyurethane, is preferably conducted with an organic polyamine such as ethylenediamine.

U.S. Pat. No. 5,173,526 discloses a process for making an aqueous polyurethane-vinyl polymer dispersion which comprises: (a) forming a carboxy-containing, water-dispersible, isocyanate-terminated polyurethane prepolymer; (b) adding a vinyl monomer composition which includes a polyethylenically-unsaturated monomer to the prepolymer to form a prepolymer/monomer mixture; (c) adding a tertiary amine to the prepolymer/monomer mixture; (d) dispersing the prepolymer/monomer mixture in water; (e) adding an oil-soluble free radical initiator and a chain-extender to the aqueous dispersion; and (f) polymerizing the vinyl monomer and completing chain extension of the prepolymer by heating the aqueous dispersion. Suitable vinyl monomers include ethylenically-unsaturated hydrocarbons, esters and ethers, especially esters of acrylic and methacrylic acids, ester of vinyl alcohol and styrene. (see column 4, lines 48–62).

U.S. Pat. No. 5,169,884 discloses a process for preparing a polymer emulsion containing an interpenetrating polymer network by forming a first polymer emulsion, mixing a second monomer emulsion with the first polymer emulsion, allowing the emulsion mixture to equilibrate, and polymerizing the emulsion mixture to provide a first polymer network which is intertwined on a molecular scale with the second polymer network. Examples of emulsified polymers include polyethylene emulsions, polyester emulsions, polyurethane emulsions and the like. The monomers are vinyl monomers, ethylenically-unsaturated compounds. Examples of suitable vinyl monomers include vinyl esters of alkanoic acids having 1–18 carbon atoms, alpha-olefins, $C_1$–$C_{18}$ alcohol esters, alkyl acrylates and methacrylates, vinyl alkyl ethers, dienes, aromatic vinyl monomers, acrylonitrile, vinyl halide monomers and vinyl esters of aromatic acids. (see column 5, lines 8–42). According to this patent, dual Tg properties have been observed for the product.

U.S. Pat. No. 4,318,833 discloses water-reducible coating compositions based on a thermoplastic polymer prepared by polymerizing one or more ethylenically-unsaturated monomers in the presence of a water-soluble fully reacted polyurethane. The ethylenically-unsaturated monomers include hydrocarbons; substituted styrenes; alkyl, cycloalkyl, aryl and aralkyl acrylates and methacrylates; acrylonitriles; vinyl esters and vinyl ethers; acrylic and methacrylic acids; and other water-soluble monomers such as hydroxyethyl acrylate or methacrylate. (see column 5, lines 15–41).

The disclosures of all of the aforementioned references are incorporated herein for all purposes as if fully set forth.

It has now been found that by imbuing reactive monomers having certain selected latent functionality into aqueous-dispersed particles of a thermoplastic isocyanate-based polymer and copolymerizing them in situ, a compatible interpenetrating polymer network of a normally incompatible polymer can be formed in the dispersed polymer. These modified dispersions can be applied to a substrate without the use of significant amounts of organic cosolvents, and can self-crosslink when exposed to appropriate cure conditions to give coatings with improved physical properties which are less affected by organic solvents. Specifically, it has been found that by polymerizing specific crosslinkable reactive monomers imbued into an aqueous-dispersed thermoplastic polymer, interpenetrating polymer networks can be formed which are clear with no visual incompatibility. When crosslinked, the polymers resulting from the present IPN's generally and preferably display a single glass transition temperature. Compared to coatings or films obtained from the unmodified thermoplastic polymer, coatings or films produced from the IPN compositions of this invention have significantly improved tensile strengths and moduli without significant loss of elongation. Additionally, improvement in solvent resistance is provided by the self-crosslinking the IPN compositions of this invention.

SUMMARY OF THE INVENTION

The present invention provides aqueous-dispersible, self-crosslinkable IPN compositions, methods for preparing those compositions, aqueous dispersions thereof, coatings therefrom, methods of coating substrates, and the crosslinked coatings and films thus produced.

The aqueous-dispersible, self-crosslinkable IPN composition of the invention comprises, in its overall concept:

(1) an aqueous-dispersible, isocyanate-based thermoplastic polymer containing urethane and/or urea linkage, and (2) an interpenetrating addition polymer formed by copolymerizing an ethylenically-unsaturated monomer having latent reactive functionality optionally with one or more other addition-copolymerizable comonomers.

The self-crosslinkable IPN compositions of the invention may be produced by imbuing the monomers and optional comonomers into particles of the thermoplastic polymer stably dispersed in an aqueous medium, and then polymerizing those monomers to form a stable dispersion of an IPN of the thermoplastic and interpenetrating polymers at least partially entangled on a molecular level. Preferably, the thermoplastic and interpenetrating polymers are also chemically bound, or contain functionality capable of chemically bonding during cure of the IPN, which chemical bonding is believed in part to help stabilize the entanglement of the two polymer systems.

The present invention also provides an aqueous dispersion comprising an aqueous medium having stably dispersed therein the aforementioned self-crosslinking IPN. These aqueous IPN dispersions are especially suited for use, for example, in formulating coating and adhesive compositions. When applied to a substrate and cured, the IPN compositions are capable of self-crosslinking to produce crosslinked films and objects possessing an excellent balance of properties which can be readily adjusted for the desired end use. A particular advantage of the present invention is that such advantageous films and objects can be formed from systems which release into the environment a minimum of VOC's.

These and other features and advantages of the present invention will be more readily understood by those of ordinary skill in the art from a reading of the following detailed description.

DETAILED DESCRIPTION OF THE PREFERRED EMBODIMENTS

The Aqueous-Dispersible Thermoplastic Polymers

The host polymer for the interpenetrating polymer network of the present invention is a aqueous-dispersible, isocyanate-based thermoplastic polymer containing urethane and/or urea linkage. Such polymers are known to those skilled in the art and are readily available commercially. They may be characterized as high molecular weight, substantially fully-reacted isocyanate-based polymers containing relatively minor amounts of internalized stabilizing groups as sufficient to render the thermoplastic polymer aqueous-dispersible without the aid of a separate surfactant. The thermoplastic polymers are normally in and of themselves not capable of self-crosslinking, but may contain functionality capable of reacting with the latent reactive functionality of the interpenetrating polymer as detailed below. Such thermoplastic polymers are described in numerous publications including, for example, previously incorporated U.S. Pat. No. 3,479,310, U.S. Pat. No. 4,092,286, U.S. Pat. No. 4,172,191, U.S. Pat. No. 4,183,836, U.S. Pat. No. 4,318,833 and U.S. Pat. No. 4,644,030, and the articles "Recent Developments in Aqueous Polyurethanes" and "Unique Waterborne Systems Based on TMXDI® (meta) Aliphatic Isocyanate and TMI® (meta) Unsaturated Isocyanate."

The internalized stabilizing groups are in general well-known and include, for example, non-ionic polyoxyalkylene groups incorporated into or pendant from the polymer backbone; ionized pendant anionic groups such as carboxylate and/or sulfonate groups located along the polymer backbone; and ionized pendant cationic groups such as ammonium, sulfonium and/or phosphonium groups located along the polymer backbone; and various mixtures thereof.

The thermoplastic polymers may be prepared in any known manner, for example, by reacting approximately equimolar amounts of a difunctional isocyanate with a difunctional isocyanate reactive component, each of which can be monomeric, oligomeric or polymeric in nature. As another example, the thermoplastic polymers may be formed by first preparing an isocyanate prepolymer by utilizing a slight equivalent excess of the diisocyanate, then chain extending the prepolymer with a lower molecular weight difunctional isocyanate reactive component. Generally, the isocyanate reactive functionality is either hydroxyl (resulting in urethane linkage) and/or amino (resulting in urea linkage).

Branching and/or minor amounts of crosslinking may be incorporated into the thermoplastic polymers by including in the reactive components minor amounts of a tri- or higher functional component. Of course, the degree of crosslinking of the thermoplastic polymer must be relatively low to retain the thermoplastic nature thereof. Preferably, the thermoplastic polymers are substantially linear polymers, that is, a polymer produced from substantially difunctional reactants.

As suitable difunctional isocyanates may be mentioned a wide variety of well-known difunctional aliphatic, cycloaliphatic, aromatic or aralphatic isocyanates as described in the previously incorporated references. Preferred include meta-1,1,3,3-tetramethylxylylene diisocyanate ("m-TMXDI") (available commercially from Cytec Industries Inc., West Paterson, N.J., under the trade designation TMXDI® (meta) aliphatic isocyanate), para-1,1,3,3-tetramethylxylylene diisocyanate ("p-TMXDI"), toluene diisocyanate ("TDI"), diphenyl methane diisocyanate ("MDI"), isophorone diisocyanate ("IPDI"), cyclohexane diisocyanate, dicyclohexylmethane diisocyanate and the like. The most preferred difunctional isocyanate is m-TMXDI.

The reactive component for the difunctional isocyanate may be selected from a wide variety of monomeric, oligomeric and polymeric compounds containing, on average, two isocyanate reactive groups which, as indicated above, are preferably hydroxyl and/or amino groups. Again, these components have been described in detail in the previously incorporated references.

As preferred examples may be mentioned oligomeric and polymeric diols such as polyester diols, polyether diols, hydroxyl-terminated polycarbonates and the like. In general, any material which has hydroxyl end groups may be employed. In addition, amine group-terminated polymers may also be employed in place of hydroxyl group-terminated polymers to provide urea linkages. The preferred hydroxyl polymer reactants are difunctional polyesters and polyethers. It is also preferred that the hydroxyl functional groups be primary hydroxyl groups.

For example, the preferred hydroxyl-terminated polyesters may be prepared by the known process of reacting a dicarboxylic acid with an equivalent excess of a diol. Typically, the dicarboxylic acid has from 4 to 8 carbon atoms, and the diol has up to about 6, or more, carbon atoms. Examples of suitable dicarboxylic acids are phthalic anhydride and succinic anhydride and like materials. Examples of suitable diols are ethylene glycol, cyclohexane dimethanol, and polyoxyethylene glycol. The preferred polyethers are polymers derived from ethylene and/or propylene oxide. Indeed, the use of polyoxyethylene glycols as the polyether or component of the polyester can in and of itself provide aqueous-dispersibility to the resulting thermoplastic polymer.

Preferably, however, the thermoplastic polymers are rendered aqueous-dispersible by the incorporation of pendant ionizable groups and subsequent ionization thereof. Especially preferred are carboxyl groups which are advantageous in that they can readily chemically bond with selected latent functionality of the interpenetrating polymer as explained in detail further below.

The pendant carboxyl groups may be derived, for example, by preparing the urethane polymer in the presence of, or by chain extending an isocyanate functional prepolymer with, a reactive hydroxyl compound which contains an internal carboxyl group, such as the dihydroxyalkanoic acids described in various of the previously incorporated references (see, for example, U.S. Pat. No. 4,318,833 at col. 4, lines 29–55). Examples of preferred carboxy-functional hydroxy compounds are 2,2-dimethylol propionic acid and 2,2-dimethylol butyric acid.

In order to render the thermoplastic polymer aqueous-dispersible, the polymer must contain at least a sufficient amount of the carboxyl groups which are ionized, for example, by neutralization with an appropriate base such as, for example, a tertiary amine such as triethyl amine, ammonia, sodium hydroxide, and the like.

As indicated previously, the molecular weight of the host thermoplastic polymer is relatively high, and preferably in the range of about 2,000 to about 1,000,000 (Mw). The thermoplastic polymers typically have a glass transition temperature from well below room temperature (about −60° C.) to about 100° C., and preferably from about −40° to about +40° C.

Suitable commercially-available aqueous-dispersible thermoplastic polymers (generally available as aqueous dispersions) include the following:

BAYHYDROL® polyurethane dispersions of Mobay and Miles;

SPENSOL® L water reducible urethane resins of NL Chemicals;

NEOREZ® water-borne urethane polymers of Zeneca Inc.;

WITCOBOND® aqueous urethane dispersions of Witco Corporation; and

SANCURE® waterborne urethane polymers of Sanncor Industries Inc.

Especially preferred aqueous-dispersible thermoplastic polymers are those based upon m-TMXDI as the diisocyanate and either difunctional polyesters or polyethers as the isocyanate reactive component, prepared with small amounts of ionized or ionizable pendant carboxyl functionality. These thermoplastic polymers and methods for their preparation are described in the previously incorporated article entitled "Unique Waterborne Systems Based on TMXDI® (meta) Aliphatic Isocyanate and TMI® (meta) Unsaturated Isocyanate." Commercially available examples thereof are available under the trade designation CYDROTHANE® of Cytec Industries Inc., West Paterson, N.J. These commercial coating materials exhibit low viscosity and low VOC because no organic cosolvent is used. The CYDROTHANEO® materials are the preferred thermoplastic polymer dispersions for use in this invention.

The Interpenetrating Addition Polymer

The interpenetrating addition polymer, at least partially entangled on a molecular level with the thermoplastic polymer, is derived from one or more addition-copolymerizable monomers having latent reactive functionality to render the IPN composition self-crosslinking. By "self-crosslinking" is it meant that:

(1) the latent reactive functionality on the interpenetrating polymer is capable of reacting with itself or a derivative thereof, for example, residual unsaturation (which can be addition polymerized), isocyanate groups (which react with water to form amine groups which in turn react with additional isocyanate groups) and epoxy groups (which can react with each other as well as the secondary hydroxyl groups produced thereby);

(2) the latent reactive functionality on the interpenetrating polymer is capable of reacting with a second type of functionality present on the interpenetrating polymer including, but not limited to, various combinations of epoxy and/or isocyanate groups with active hydrogen containing groups, for example, combinations of epoxy groups and hydroxyl groups, combinations of epoxy groups and carboxyl groups, combinations of isocyanate groups and hydroxyl groups, combinations of isocyanate groups and epoxy groups, or other combinations thereof; and/or (3) the latent reactive functionality on the polymer is capable of reacting with functionality present on the thermoplastic polymer, for example, the interpenetrating polymer may contain epoxy and/or isocyanate groups, and the thermoplastic polymer may contain carboxyl, hydroxyl and/or amino groups.

As examples of isocyanate functional addition polymerizable monomers may be mentioned meta-isopropenyl-α,α-dimethylbenzyl isocyanate ("m-TMI"), para-isopropenyl-α, α-dimethylbenzyl isocyanate ("p-TMI") and isocyanato ethyl methacrylate ("IEM").

As examples of epoxy functional addition polymerizable monomers may be mentioned glycidyl acrylate, glycidyl methacrylate and allyl glycidyl ether.

As examples of additional polymerizable monomers which, after normal free-radical polymerization, produce a polymer containing residual unsaturation may be mentioned conjugated dienes such as 1,3-butadiene.

As examples of hydroxyl functional addition polymerizable monomers may be mentioned allyl alcohol and hydroxy alkyl acrylates and methacrylates such as hydroxyethyl acrylate and methacrylate, hydroxypropyl acrylate and methacrylate, and hydroxybutyl acrylate and methacrylate.

As examples of carboxyl functional addition polymerizable monomers may be mentioned acrylic and methacrylic acid, maleic acid and anhydride, fumaric acid, and itaconic acid and anhydride.

In addition to the aforementioned functional monomers, one or more other addition copolymerizable monomers may also be utilized in the interpenetrating polymer. As suitable examples may generally be mentioned acrylates, methacrylates, styrenic monomers, acrylamides, acrylonitriles, vinyl compounds, etc. Specific preferred examples include alkyl acrylates and methacrylates, and particularly lower alkyl acrylates and methacrylates such as methyl acrylate and methacrylate, ethyl acrylate and methacrylate, and butyl acrylate and methacrylate; styrene and α-methylstyrene; acrylamide and methacrylamide; acrylonitrile and methacrylonitrile; vinyl acetate; vinyl chloride; vinyl ethers; and like monomers. Particularly preferred copolymerizable monomers include the lower alkyl acrylates such as methyl methacrylate, ethyl acrylate and butyl methacrylate.

In a first specific preferred embodiment, the interpenetrating polymer is derived from (i) an ethylenically-unsaturated monomer containing isocyanate functionality and (ii) one or more copolymerizable monomers. The amount of the isocyanate functional monomer may be varied depending upon the properties desired within a range of about 5 to about 50%, preferably from about 5 to about 25% by weight, based on the total weight of monomers charged. A preferred example of an interpenetrating polymer within this first preferred embodiment is a copolymer of about 5–25% by weight m-TMI and about 75–95% by weight methyl methacrylate ("MMA").

In a second specific preferred embodiment, the interpenetrating polymer is derived from (i) an ethylenically-unsaturated monomer containing isocyanate functionality, (ii) a hydroxyl group-containing ethylenically-unsaturated monomer such as hydroxyethyl acrylate, and (iii) optionally one or more other copolymerizable monomers. In this embodiment, the amounts of the isocyanate functional monomer and hydroxyl group-containing monomer may be varied depending upon the properties desired. Typically, the amount of the isocyanate functional monomer is from about 5 to about 50%, preferably from about 5 to about 25% by weight, based on the total weight of monomers charged. While the amount of hydroxyl group-containing monomer relative to the isocyanate functional monomer may be varied, it is preferred to employ them in approximately equimolar amounts. A preferred example of an interpenetrating polymer within this second embodiment is a copolymer of about 5–25% weight m-TMI, an approximately equimolar amount of hydroxyethyl acrylate, with the balance being one or more of MMA and butyl methacrylate ("BMA").

In a third specific preferred embodiment, the interpenetrating polymer is derived from (i) an ethylenically-unsaturated monomer containing epoxy functionality and (ii) one or more copolymerizable monomers. The amount of the epoxy group-containing monomer may be varied depending upon the properties desired within a range of about 5 to about 50%, preferably from about 5 to about 25% by weight, based on the total weight of monomers charged. A preferred example of an interpenetrating polymer within this third embodiment is a copolymer of about 5 to 25% by weight glycidyl methacrylate ("GMA") and about 75 to 95% by weight of one or more of MMA and BMA.

In a fourth specific preferred embodiment, the interpenetrating polymer is derived from (i) an ethylenically-unsaturated monomer containing epoxy functionality, (ii) a hydroxyl group-containing ethylenically-unsaturated monomer such as hydroxyethyl acrylate, and (iii) optionally one or more other copolymerizable monomers. In this embodiment, the amounts of the epoxy-functional monomer and hydroxyl group-containing monomer may be varied depending upon the properties desired. Typically, the amount of the epoxy-functional monomer is from about 5 to about 50%, preferably from about 5 to about 25% by weight, based on the total weight of monomers charged. While the amount of hydroxyl group-containing monomer relative to the epoxy-functional monomer may be varied, it is preferred to employ them in approximately equimolar amounts. A preferred example of an interpenetrating polymer within this fourth embodiment is a copolymer of about 5–25% weight GMA, an approximately equimolar amount of hydroxyethyl acrylate, with the balance being one or more of MMA and BMA.

In a fifth specific preferred embodiment, the interpenetrating polymer may be derived from (i) an ethylenically-unsaturated monomer containing isocyanate functionality, (ii) an ethylenically-unsaturated monomer containing epoxy functionality, and (iii) optionally one or more copolymerizable monomers. The amounts of each of the functional monomers may be varied depending upon the properties desired. Typically, the amount of each functional monomer is from about 5 to about 50%, preferably from about 5 to about 25% by weight, based on the total weight of monomers charged. A preferred example of an interpenetrating polymer within this fifth embodiment is a copolymer of about 5–25% by weight m-TMI, about 5–25% by weight GMA, with the balance being one or more of MMA and BMA.

As indicated above, the type and extent of crosslinking of the IPN, and hence properties such as solvent resistance, may be controlled by selecting appropriate types and amounts of latent functional monomers for the interpenetrating polymer. By way of illustration, the isocyanate group of the isocyanate functional monomer, when cured in the presence of moisture, reacts with the moisture to form amino groups which, in turn, then react with unreacted isocyanate groups to provide urea linkages, thus internally crosslinking the copolymer network. If a hydroxy-functional monomer (such as hydroxyethyl acrylate) is also present together with an isocyanate-functional monomer, urethane linkages are formed between the isocyanate and hydroxy groups, thus forming another type of internal crosslink in the copolymer network.

If a glycidyl functional monomer is present, its glycidyl group reacts with the pendant carboxyl groups of the host urethane polymer, thus crosslinking the interpenetrating polymer to the host polymer. Ideally, when glycidyl and isocyanate-functional monomers are both present, one obtains an internally-crosslinked IPN as well as crosslinks (chemical bonding) between the interpenetrating polymer and host polymer. The type and amount of crosslinking can thus be varied by selecting the appropriate monomers and amounts thereof, as is apparent to those of ordinary skill in the art.

Methods for Preparing IPN Compositions

Interpenetrating polymer networks may be formed within the host urethane polymer by copolymerizing the latent functional and other optional copolymerizable monomers imbued in the host polymer. A suitable thermoplastic polymer aqueous dispersion may be prepared as described above, or a commercially available dispersion may be provided. The monomers are preferably preblended and then added to the aqueous dispersion. The amounts of monomers and host polymer may be varied. It is preferred that the thermoplastic polymer constitute about 30 to about 95 weight percent of the IPN composition, based on the dry total weight of both the thermoplastic polymer and interpenetrating polymer. Sufficient time is allowed for the dispersed thermoplastic polymer particles to imbue the monomers. While imbuing time may vary with the type and amount of monomers, generally about 15–30 minutes is sufficient. An indication that the monomers are imbued into the thermoplastic polymer particles is a noticeable increase in the viscosity of the dispersion. This is caused by a swelling of the polymer particles by the imbued monomers.

Generally, the addition polymerization should be conducted under conditions whereby the latent reactive functionality does not substantially react, although some reaction between the latent functionality and the stabilizing groups (for example, carboxyl groups) of the thermoplastic polymer is permissible and may even be advantageous.

Once the monomers are imbued into the urethane polymer particles, free-radical polymerization is initiated by, for example, adding a conventional free-radical initiator such as a peroxide-type initiator. Suitable peroxide initiators include any hydroperoxide, such as t-butyl hydroperoxide, etc. The preferred initiator is t-butyl hydroperoxide. The amount and type of initiator used is generally not critical. Due to the fact that some free radical initiators require higher temperatures to initiate polymerization, which temperatures may be so high as to initiate premature crosslinking of the IPN, it is preferred to also add a reducing agent and form a redox-type catalyst, which allows polymerization at about room temperature. Suitable reducing agents include metallic salts (such as ferric chloride, ammonium iron and ferric sulfate hexahydrate), sodium sulfate and sodium metabisulfite. The amount and particular reducing agent used is not critical, although ferric chloride is preferred.

It is also preferred to operate the free-radical polymerization under oxygen-free conditions. Typically, the polymerization will proceed as an exothermic reaction over a relatively short period of time, on the order of about 5 to about 30 minutes. The reaction temperature typically is ambient temperatures to about 70° C.; about 40° C. is preferred.

When the IPN is formed according to the present invention, at least a portion of the formed interpenetrating polymer is entangled on a molecular level with the host polymer. In addition, a portion of the interpenetrating polymer may be present in the IPN as separate domains, or may become chemically bound to the host polymer through various crosslinking reactions. Preferably, upon formation of the IPN or the cure thereof, the interpenetrating polymer is both entangled on a molecular level with the host polymer as well as chemically bound thereto. Cured films from such IPN compositions appear to exhibit the best combination of solvent resistance with an excellent balance of physical properties.

The aqueous dispersions of the invention have good room temperature storage stability, and can find use in a variety of fields such as coatings and adhesives.

Coating Process

Aqueous dispersions of the IPN compositions of the present invention are particularly useful as surface coatings and adhesives for any number of well-known substrates including wood, plastic, metal, glass, etc., and as free-standing films. In particular, aqueous dispersions of the crosslinkable IPN compositions of this invention, when coated, dried and cured, form tough, clear coatings having excellent solvent resistance. It is especially preferred and advantageous when the cured IPN's display a single glass transition temperature. An additional advantage is the very low VOC of these coating compositions due to the fact that no organic cosolvent need be added.

Coatings can be formulated from these aqueous dispersions by well-known techniques. Such coatings may contain any one of a number of well-known additives depending on the desired end use including, for example, pigments, fillers, levelling agents, anti-foaming agents, light stabilizers, antioxidants, anti-sag agents and the like.

Although not required to achieve suitable results, such coating compositions may also comprise separate crosslinking agents for altering the properties of the ultimate cured compositions. Choosing a crosslinking agent appropriate for a particular reactive functionality of the IPN is well within the ability of those skilled in the art, and need not be discussed in further detail.

The coating compositions of the invention can be coated onto substrates using conventional techniques and equipment. Once coated (or cast as a film), the compositions may be air dried at room temperature, whereby the particles coalesce into a continuous crosslinkable coating or film. Upon curing at elevated temperature (for example, on the order of about 95°–175° C. for about 10–30 minutes), a crosslinked coating or film is obtained which exhibits excellent solvent resistance and improved physical properties in comparison to coatings or films produced from either the unmodified thermoplastic polymer dispersion or interpenetrating polymer separately or physically blended. For example, the tensile strength and modulus are improved without substantial reduction in elongation. The self-crosslinking of the IPN composition greatly improves the solvent resistance.

The foregoing general discussion of the present invention will be exemplified by the following examples offered by way of illustration and not limitation on the scope of the invention. In the examples which follow:

Tensile strength is determined by ASTM-882 on a sample of 2–6 mil thickness.

Modulus, unless otherwise indicated, is expressed as 100% or secant modulus, as determined by ASTM-882.

The rheology "crosslinking" factor, G', when measured, signifies the rubbery plateau of the material and is a relative measurement of the extent of total crosslinking. As G' increases, the rubbery plateau increases.

The "toughness" value, when given, represents the area under the stress-strain curve. The higher the value, the tougher the material.

The glass transition temperatures were measured by Rheovibron spectrometer.

EXAMPLES

Example 1 (Comparative)

CYDROTHANE® HP 5035, a water-based polyester backbone polyurethane dispersion, available from Cytec Industries (solids content 35%), was drawn down onto a glass plate using a number 70 wire cater, air dried at room temperature for 1 hour, then cured for 30 minutes at 120° C. The resulting film was removed from the glass plate and tested for physical and rheological properties.

Example 2 (Comparative)

Same as Example 1, except CYDROTHANE® HP 4033, a water-based polyether backbone polyurethane dispersion, available from Cytec Industries (solids content 33%) was used.

Example 3

This Example describes the preparation of an m-TMI/acrylic latex for blending with CYDROTHANE® HP 5035 and HP 4033 as controls.

To a 500 ml flask equipped with stirring, thermometer, condenser, $N_2$ sparge tube and port for the addition of catalyst is charged 150.0 grams of deionized water, 2.1 grams of dodecylsulfate sodium salt and Aerosol® OT-75. With stirring on, the contents of the flask are nitrogen-sparged for 25 minutes. With nitrogen sparge continuing, a mixture of 5.0 grams of m-TMI (commercially available under the trade designation TMI® (meta) unsaturated aliphatic isocyanate of Cytec Industries, West Paterson, N.J.), 35.0 grams of methyl methacrylate and 60.0 grams of ethyl acrylate is added to the flask. After 20 minutes, t-butyl hydroperoxide (70% solids in water) is added and the flask placed in a 40° C. water bath. After two minutes the contents of the flask had reached 37° C. and a premixed solution of 1.2 grams of sodium formaldehyde sulfoxylate, 3.8 grams of deionized water, and 0.32 gram of ferric chloride complex ($FeCl_3$ complex=deionized water 52.55 weight %, ethylene diamine tetraacetic acid tetrasodium salt 39.0 weight %, and ferric chloride hexahydrate 8.45 weight %) was added. The reaction became exothermic, reaching a peak of 43° C. 19 minutes after the addition of the $FeCl_3$ complex. Fifteen minutes later, the exotherm subsided to the 40° C. temperature of the water bath. The reaction was continued for an additional 80 minutes, then cooled to room temperature and filtered. The solids were 39.6%.

Example 4 (Comparative)

Blends were prepared by rapidly stirring the polyurethane dispersion shown in Tables I and II and slowly adding various amounts of the m-TMI/acrylic latex of Example 3. The blends were drawn down onto plates using a #70 wire cater, air dried for 1 hour, then baked for 30 minutes at 120° C. The results are shown in the following Tables I and II.

TABLE I

CYDROTHANE ® HP 5035:m-TMI/acrylic latex blend

| Weight Percent Dispersion | Tensile Strength (psi) | Modulus (psi) | Elongation (%) |
| --- | --- | --- | --- |
| 100 | 4850 | 3680 | 229 |
| 90 | 3910 | 3130 | 211 |
| 85 | 3770 | 2690 | 243 |
| 80 | 3970 | 2620 | 244 |
| 10 | 3980 | 2120 | 231 |
| 0 | 1630 | 1340 | 169 |

TABLE II

CYDROTHANE ® HP 4033:m-TMI/acrylic latex blend

| Weight Percent Dispersion | Tensile Strength (psi) | Modulus (psi) | Elongation (%) |
| --- | --- | --- | --- |
| 100 | 4830 | 740 | 476 |
| 90 | 2780 | 760 | 309 |
| 85 | 2840 | 830 | 314 |
| 80 | 2850 | 870 | 317 |
| 0 | 1630 | 1340 | 169 |

Based on the above results in Tables I and II, physically blending an m-TMI/acrylic latex with the urethane dispersions adversely affects the physical properties of films produced from the dispersions.

Examples 5–33 and 35–43 describe the preparation of IPN compositions of this invention.

Example 5

To a 500 ml flask equipped with stirring, thermometer, condenser, nitrogen and water bath set at 40° C. was added 285.7 grams of CYDROTHANEO® HP 1035 urethane aqueous dispersion. With stirring on and nitrogen sparging, a preblended charge of monomers of 1.7 grams of m-TMI, 11.7 grams of methyl methacrylate and 19.9 grams of ethyl acrylate was added. After 20 minutes, 0.7 gram of t-butyl hydroperoxide (70% solids in water) was added and the flask immediately placed in the water bath. After two minutes the temperature of the flask had risen to 30° C., whereupon a premixed solution of 0.4 gram of sodium formaldehyde sulfoxylate, 1.27 grams of deionized water and 0.107 gram of ferric chloride complex (as in Example 3), was added. The exotherm that followed rose to 48° C. in six minutes and immediately began dropping to the bath temperature (40° C.) over 45 minutes. Stirring was continued for an additional 70 minutes at 40° C., then cooled to room temperature and filtered. Weight of coagulum was 3.7 grams, pan solids were 41.3% solids.

Example 6

Same as Example 5 except that 285.7 grams of CYDROTHANE® HP 5035 was used. Pan solids were 42.0% solids and 1.4 grams of coagulum.

Example 7

Same as Example 5 except CYDROTHANEO® HP 4033 was used. Pan solids were 38.0% solids and 1.5 grams of coagulum.

Example 8

Same as Example 5 except 333.3 grams of CYDROTHANE® HP 4033 as the dispersion, and a monomer blend of 1.7 grams of m-TMI, 23.3 grams of butyl methacrylate (BMA) and 8.3 grams of methyl methacrylate (MMA), were used. Pan solids of product was 36.8% and 0.9 grams of coagulum.

Example 9

Same as Example 8 except monomer blend contained 0.7 gram of m-TMI and 31.6 grams of MMA. Pan solids were 36.8% solids and coagulum 4.4 grams.

Example 10

Same as Example 8 except monomer blend contained 6.7 grams of m-TMI, 21.6 grams of BMA and 5.0 grams of MMA. Pan solids 36.8% and 5.0 grams of coagulum.

Example 11

Same as Example 8 except monomer blend contained 3.4 grams of m-TMI, 23.0 grams of BMA and 6.7 grams of MMA. Pan solids were 36.9% and coagulum 1.7 grams.

Example 12

Same as Example 11 except 285.7 grams of CYDROTHANE® HP 5035 was used. Pan solids were 41.5% and coagulum was 0.3 grams.

Example 13

Same as Example 8 except monomer blend contained 1.7 grams of m-TMI, 1.0 gram of hydroxyethyl acrylate (HEA) and 30.6 grams of MMA. Pan solids 37.4% and coagulum= 0.8 grams.

Example 14

Same as Example 8 except monomer blend contained 3.4 grams of m-TMI, 2.0 grams of HEA and 27.9 grams of MMA. Pan solids 41.7% coagulum 2.5 grams.

Example 15

Same as Example 8 except monomer blend contained 6.8 grams of m-TMI, 4.0 grams of HEA and 22.5 grams of MMA. Pan solids 41.7% coagulum 2.5 grams.

Example 16

Same as Example 6 except monomer blend contained 1.7 grams of m-TMI, 1.0 gram of HEA and 30.6 grams of MMA. Pan solids=42.1% and coagulum 1.6 grams.

Example 17

Same as Example 6 except monomer blend contained 3.4 grams of m-TMI, 2.0 grams of HEA and 27.9 grams of MMA. Pan solids=42.1% and coagulum 1.6 grams.

Example 18

Same as Example 6 except monomer blend contained 6.8 grams m-TMI, 4.0 grams of HEA and 22.5 grams of MMA. Solids 42.3% coagulum 2.3 grams.

Example 19

Same as Example 8 except monomer blend contained 1.7 grams of glycidyl methacrylate (GMA), 23.3 grams of BMA and 8.3 grams of MMA. Pan solids 36.7, coagulum 4.4 grams.

Example 20

Same as Example 8 except monomer blend contained 3.4 grams of GMA, 23.2 grams of BMA and 6.7 grams of MMA. Solids 36.9% coagulum 3.7 grams.

Example 21

Same as Example 8 except monomer blend contained 6.7 grams of GMA, 21.6 grams of BMA and 5.0 grams of MMA. Solids 36.8% coagulum 2.1 grams.

Example 22

Same as Example 8 except monomer blend contained 1.7 grams of m-TMI, 1.0 gram of GMA and 30.6 grams of MMA. Solids 36.8% coagulum 2.1 grams.

Example 23

Same as Example 8 except monomer blend contained 3.4 grams of m-TMI, 2.0 grams of GMA and 27.9 grams of MMA. Solids 36.7% coagulum 2.9 grams.

Example 24

Same as Example 8 except monomer blend contained 6.8 grams of m-TMI, 4.0 grams of GMA and 22.5 grams of MMA. Solids=36.6% coagulum 1.0 grams.

Example 25

Same as Example 8 except monomer blend contained 1.7 grams of GMA, 1.0 gram of HEA and 30.6 grams of MMA. Solids 41.8% coagulum 2.1 grams.

Example 26

Same as Example 6 except monomer blend contained 3.4 grams of GMA, 2.0 grams of HEA and 27.9 grams of MMA. Solids 41.6% coagulum 2.5 grams.

Example 27

Same as Example 6 except monomer blend contained 6.8 grams of GMA, 4.0 grams of HEA and 22.5 grams of MMA. Solids=41.3% coagulum 2.5 grams.

Example 28

Same as Example 6 except monomer blend contained 1.7 grams of m-TMI, 1.0 gram of GMA and 30.6 grams of MMA. Solids 42.4% coagulum 3.5 grams.

Example 29

Same as Example 6 except monomer blend contained 3.9 grams of m-TMI, 2.0 grams of GMA and 27.9 grams of MMA. Solids 42.5% coagulum 3.0 grams.

Example 30

Same as Example 6 except monomer blend contained 6.8 grams of m-TMI, 4.0 grams of GMA and 22.5 grams of MMA. Solids 42.3% coagulum was 1.3 grams.

Example 31

Same as Example 8 except monomer blend contained 1.7 grams of GMA and 31.6 grams of MMA. Solids 39.8%, coagulum 2.1 grams.

Example 32

Same as Example 8 except monomer blend contained 3.4 grams of GMA and 29.9 grams of MMA. Solids 39.9%, coagulum 1.5 grams.

Example 33

Same as Example 8 except monomer blend contained 6.8 grams of GMA and 26.5 grams of MMA. Solids 38.8, coagulum 3.3 grams.

Example 34 (Comparison)

Same as Example 8 except only monomer was MMA (33.3 grams). Solids 40.0% coagulum 2.7 grams.

Example 35

Same as Example 5 except dispersion was a blend of CYDROTHANE® HP 4033 (151.1 grams) and HP 5035 (142.9 grams)(50/50 solids blend) and the monomer blend contained 3.4 grams of m-TMI, 2.0 grams of GMA and 27.9 grams of MMA. Solids 41.2%, coagulum 1.4 grams.

Example 36

Same as Example 35 except dispersion was a blend of 214.3 grams of CYDROTHANE® HP 5035 and 75.8 grams of CYDROTHANEO® HP 4033 was used (75/25 solids blend). Solids of product 41.5%, coagulum 1.5 grams.

Example 37

Same as Example 35 except dispersion was a blend of 71.4 grams of CYDROTHANE® HP 5035 and 227.3 grams of CYDROTHANE® HP 4033 (25/75 solids blend). Product solids=40.5%, coagulum 0.8 grams.

Example 38

Same as Example 36 except monomer blend contained 3.4 grams of m-TMI, 27.9 grams of MMA and 2.0 grams of HEA. Product was 41.6% solids and 1.2 grams of coagulum.

Example 39

Same as Example 35 except monomer blend contained 3.4 grams of m-TMI, 27.9 grams of MMA and 2.0 grams of HEA. Product was 40.7% solids and 2.1 grams of coagulum.

Example 40

Same as Example 37, except monomer blend contained 3.4 grams of m-TMI, 27.9 grams of MMA and 2.0 grams of HEA. Product was 40.0% solids, coagulum 2.1 grams.

Example 41

Same as Example 31 except dispersion was CYDROTHANE® HP 5035. Product solids 42.2% and coagulum was 1.8 grams.

Example 42

Same as Example 32 except dispersion was CYDROTHANE® HP 5035. Product solids was 41.8% and coagulum was 1.9 grams.

Example 43

Same as Example 33 except dispersion was CYDROTHANE® HP 5035. Product solids was 41.7% solids and coagulum was 2.3 grams.

Films were made from the IPN compositions of Examples 5–43, using the same procedure as in Example 4, and tested. The results are shown in Table III.

TABLE III

| Ex. | Tensile Strength (psi) | Modulus (psi) | Elongation % | Crosslinking (G') | Toughness | Tg (°C.) |
|---|---|---|---|---|---|---|
| 5 | 4170 | 940 | 360 | — | — | −18 |
| 6 | 4504 | 2850 | 242 | — | — | +18 |
| 7 | 2015 | 244 | 528 | — | — | −35 |
| 8 | 3220 | 968 | 373 | — | — | −36 |
| 9 | 3776 | 1186 | 366 | — | — | −42 |
| 10 | 3006 | 724 | 392 | — | — | −30 |
| 11 | 2788 | 651 | 398 | — | — | −27 |
| 12 | 4400 | 3180 | 200 | 0.7 | — | +25 |
| 13 | 5300 | 1200 | 431 | 0.2 | — | −41 |
| 14 | 4910 | 1310 | 399 | 1.0 | — | −45 |
| 15 | 5630 | 1780 | 358 | 0.9 | — | −48 |
| 16 | 4540 | 220,000* | 9 | 0.3 | — | +35 |
| 17 | 4560 | 218,000* | 27 | 0.9 | — | +23 |
| 18 | 5170 | 4220 | 164 | 2.0 | — | +15 |
| 19 | 2700 | 600 | 436 | 1.6 | — | −32 |
| 20 | 2860 | 610 | 456 | 4.9 | — | −36 |
| 21 | 2410 | 750 | 340 | 11.5 | — | −49 |
| 22 | 4420 | 1360 | 379 | 1.3 | — | −49 |
| 23 | 4420 | 1570 | 336 | 3.7 | — | −53 |
| 24 | 4670 | 1930 | 296 | 8.7 | — | −49 |
| 25 | 3280 | 246,000* | 81 | 2.5 | — | +33 |
| 26 | 3330 | 205,000* | 22 | 5.4 | — | +24 |
| 27 | 3390 | 226,000* | 97 | 8.7 | — | −3 |
| 28 | 1963 | 89,000* | 9 | 1.5 | 267 | +32 |
| 29 | 2217 | 229,000* | 17 | 2.6 | 738 | +32 |
| 30 | 2028 | 222,100* | 30 | 7.0 | 1347 | +28 |
| 31 | 2832 | 13,700* | 371 | 1.1 | 12130 | −50 |
| 32 | 1908 | 11,810* | 336 | 3.1 | 8623 | −49 |
| 33 | 2005 | 11,970* | 318 | 8.4 | 8253 | −50 |
| 34 | 5520 | 1470 | 394 | 0.1 | — | −49 +55 |
| 35 | 1599 | 58,240* | 202 | 3.0 | 7311 | −44 +6 |
| 36 | 2092 | 96,970* | 58 | 2.3 | 2571 | +16 |
| 37 | 1755 | 23,610* | 269 | 3.3 | 7997 | −40 |
| 38 | 3067 | 165,000* | 51 | — | 3089 | — |
| 39 | 1680 | 3136 | 235 | — | 8000 | — |
| 40 | 1486 | 2102 | 312 | — | 7966 | — |
| 41 | 2918 | 200,800* | 4 | — | 512 | — |
| 42 | 3422 | 213,100* | 4 | — | 858 | — |
| 43 | 3948 | 216,400* | 3 | — | 195 | — |
| Controls | | | | | | |
| HP4030 | 2970 | 350 | 522 | 0.0 | — | −46 |
| HP5035 | 4850 | 3680 | 229 | 0.0 | — | +17 |

*Youngs modulus

Discussion of Results

As mentioned above, depending upon the particular copolymerizable monomers and amounts selected, the type and extent of crosslinks in a cured coating can be varied and controlled. When no functional monomer is used in the monomer charge, which is outside of the present invention, no internal self-crosslinking occurs upon cure of the IPN, two glass transitions are observed, and the resulting films suffer from poor solvent resistance (see Example 34).

When m-TMI is employed in various amounts along with various copolymerizable methacrylates, self-crosslinking appeared to occur during the cure of the coating in a limited but increasing amount as the level of m-TMI increased. The self-crosslinking is believed to have occurred through the initial reaction of a portion of pendant NCO groups of the interpenetrating polymer with water, followed by reaction of a portion of the remaining NCO groups with the resulting amino groups. More important was the observed increase and a boarding of a single Tg and the crystal clarity of the film. These results were unexpected due to the differences in and incompatibility of the separate thermoplastic urethane polymers and the interpenetrating polymers (see example 4). However, when such copolymers were uniformly formed in the dispersed urethane polymers according to this invention, the materials were in fact compatible and appeared clear when coated. Improvement in tensile strength and modulus, with only a minimum loss in elongation, is shown in Examples 5–12.

When hydroxyethyl acrylate ("HEA") was used with m-TMI (examples 13–18), internal crosslinks are believed to have formed within the IPN network between the pendant NCO and hydroxy groups without having to rely on the presence of moisture, which improved the rubbery plateau (G') of films from those modified dispersions.

The urethane polymer dispersion utilized in these examples, although thermoplastic in nature, have potential crosslinking sites from the ionized pendant carboxyl groups that are necessary for aqueous dispersibility. By polymerizing acrylic monomers containing pendant epoxy groups, such as GMA, one should be able to produce permanent crosslinks between the IPN and the dispersion, which should stabilize the entanglement of the two polymers. Using three levels of GMA (5, 10 and 20% by weight of the interpenetrating monomers), IPN's were produced which, when cured at 120° C. for thirty minutes, gave films with a high degree of crosslinks (Examples 19–21 and 31–33). Increasing the % of GMA appeared to increase and broaden the rubbery plateau (G'). The use of GMA alone as compared to m-TMI alone shifted the rubbery plateau upwards and also gave slightly increased modulus and stress at break values.

In experiments where 5, 10 and 20% by weight m-TMI and an equivalent molar amount of GMA were polymerized in urethane polymer dispersions (Examples 22–24 and 28–30), films produced from those compositions not only showed the high degree of crosslinking associated with the use of GMA, but an additional shift to the leathery region was provided and the plateau values were moved upwards compared to GMA alone. The tensile properties did not reflect the changes since the rubbery region was above room temperature. A combination of m-TMI/GMA in CYDROTHANE® 4033 shifted the lower part of the leathery region an additional amount to the right and increased slightly the rubbery plateau values compared to the use of GMA alone. The tensile properties of the combination of GMA and m-TMI fell in between the two individual systems. The combination of GMA and m-TMI, therefore, provided a desirable combination of crosslinking and tensile properties.

Only a limited number of preferred embodiments of the present invention have been described and exemplified above. One of ordinary skill in the art, however, will recognize numerous substitutions, modifications and alterations which can be made without departing from the spirit and scope of the invention as limited by the following claims.

What is claimed is:

1. A cured crosslinked coating on a substrate obtained by coating the substrate with a coating composition and curing the so-applied coating, wherein the coating composition comprises an aqueous medium having stably dispersed therein a self-crosslinking interpenetrating polymer network composition comprising:

(a) an aqueous-dispersible, substantially fully reacted isocyanate-based thermoplastic polymer containing urethane and/or urea linkage, and (b) an interpenetrating network of an addition polymer of an ethylenically-unsaturated monomer comprising latent reactive functionality selected from the group consisting of isocyanate and epoxy functionality, wherein the thermoplastic polymer and the interpenetrating polymer are different polymers, and wherein the interpenetrating network is at least partially entangled on a molecular level with the thermoplastic polymer.

2. The coated substrate of claim 1, wherein the interpenetrating polymer network comprises from about 30 to about 95 percent by weight of the thermoplastic polymer, based on the dry total weights of the thermoplastic polymer and interpenetrating polymer.

3. The coated substrate of claim 1, wherein the thermoplastic polymer is a substantially linear, substantially fully-reacted isocyanate-based thermoplastic polymer having a molecular weight (Mw) of from about 2000 to about 1,000,000.

4. The coated substrate of claim 3, wherein the thermoplastic polymer comprises urethane linkage obtained by reacting a polyester or polyether having terminal hydroxy groups with a difunctional isocyanate compound.

5. The coated substrate of claim 4, wherein the difunctional isocyanate compound is a tetramethylxylylene diisocyanate.

6. The coated substrate of claim 1, wherein the latent reactive functionality is selected from the group consisting of an isocyanate group; an epoxy group; a combination of an isocyanate group with an active hydrogen containing group; a combination of an epoxy group with an active hydrogen containing group; a combination of an epoxy group and an isocyanate group; and a combination of an epoxy group, an isocyanate group and an active hydrogen containing group.

7. The coated substrate of claim 6, wherein the latent reactive functionality is selected from the group consisting of an epoxy group; an isocyanate group; a combination of an epoxy group with a hydroxyl group; a combination of an epoxy group with a carboxyl group; a combination of an isocyanate group with a hydroxyl group; a combination of an isocyanate group with an epoxy group; and a combination of an isocyanate group and an epoxy group with a hydroxyl group.

8. The coated substrate of claim 1, wherein the ethylenically-unsaturated monomer having latent reactive functionality comprises an isopropenyl-α,α-dimethyl benzyl isocyanate.

9. The coated substrate of claim 1, wherein the ethylenically-unsaturated monomer having latent reactive functionality comprises an epoxy functional addition polymerizable monomer.

10. The coated substrate of claim 1, wherein the interpenetrating polymer is a copolymer of an ethylenically-unsaturated monomer having latent reactive functionality with another addition copolymerizable comonomer.

11. The coated substrate of claim 1, wherein the thermoplastic polymer comprises an ionizable pendant group.

12. The coated substrate of claim 11, wherein the ionizable pendant group is reactive with the latent functionality of the interpenetrating polymer.

13. The coated substrate of claim 12, wherein the ionizable pendant group is a carboxyl group.

14. The coated substrate of claim 1, wherein the thermoplastic polymer and interpenetrating polymer are both entangled and chemically bound.

* * * * *